(12) United States Patent
Yeates et al.

(10) Patent No.: US 8,610,029 B2
(45) Date of Patent: Dec. 17, 2013

(54) SYSTEMS AND METHODS FOR USING A PORTION OF A HOUSING IN A BUTTON ASSEMBLY

(75) Inventors: Kyle Yeates, Palo Alto, CA (US); Brian Lynch, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 293 days.

(21) Appl. No.: 13/092,719

(22) Filed: Apr. 22, 2011

(65) Prior Publication Data

US 2011/0290779 A1    Dec. 1, 2011

Related U.S. Application Data

(60) Provisional application No. 61/327,087, filed on Apr. 22, 2010.

(51) Int. Cl.
| | |
|---|---|
| *B23K 26/02* | (2006.01) |
| *B32B 37/00* | (2006.01) |
| *B32B 37/12* | (2006.01) |
| *B32B 38/04* | (2006.01) |
| *B26D 7/00* | (2006.01) |
| *B26D 7/01* | (2006.01) |

(52) U.S. Cl.
USPC ...... 219/121.72; 264/400; 264/482; 156/256; 156/265; 156/272.8; 83/374

(58) Field of Classification Search
None
See application file for complete search history.

(56) References Cited

U.S. PATENT DOCUMENTS

| | | | | |
|---|---|---|---|---|
| 5,268,054 A | * | 12/1993 | Bakhos | 156/250 |
| 5,665,649 A | * | 9/1997 | Harris et al. | 156/256 |
| 6,800,351 B1 | * | 10/2004 | Pflug et al. | 428/73 |
| 6,802,927 B2 | * | 10/2004 | Biegelsen et al. | 156/248 |
| 8,182,638 B2 | * | 5/2012 | Weber et al. | 156/257 |
| 2010/0282405 A1 | * | 11/2010 | Weber et al. | 156/242 |

* cited by examiner

*Primary Examiner* — Joseph M Pelham
(74) *Attorney, Agent, or Firm* — Brownstein Hyatt Farber Schreck, LLP

(57) ABSTRACT

Systems and methods for cutting a cover from a portion of a housing of an electronic device, and positioning the cover within the housing are provided. An electronic device can include an interface having an actuator over which a cover is placed. The cover can by cutting away a portion of a housing of the electronic device. To improve the aesthetic appeal of the device, the orientation of the cover can be maintained while and after it is cut away from the housing by a fixture used for the cutting process. An adhesive sheet can be placed over the housing and the cover to ensure that the cover remains stationary relative to the housing once it is separated from the housing.

8 Claims, 6 Drawing Sheets

SYSTEMS AND METHODS FOR USING A PORTION OF A HOUSING IN A BUTTON ASSEMBLY

CROSS-REFERENCE TO RELATED APPLICATION

This application claims the benefit of previously filed U.S. Provisional Patent Application No. 61/327,087, filed on Apr. 22, 2010, entitled "LASER CUTTING OF BUTTONS IN AN ELECTRONIC DEVICE HOUSING," the entirety of which is incorporated by reference herein in its entirety.

BACKGROUND

An electronic device can include one or more interfaces that allow a user to interact with a device. For example, an electronic device can include one or more buttons that a user can press. Each interface can include an actuator for detecting a user's interaction with the interface, and a cover coupled to the actuator and with which the user interacts. In some cases, a housing of the device can include an opening through which the actuator can be accessed. The cover can be placed at least partially in the opening to protect the actuator.

SUMMARY

Systems and methods for cutting a cover from a portion of a housing of an electronic device, and positioning the cover within the housing as part of a button assembly are provided.

To improve the aesthetic appeal of an input interface, a cover placed over an actuator can be constructed from a portion of the housing. For example, a closed loop can be cut in the housing to create an opening in the housing. The material removed from the housing (e.g., a cut away portion of the housing) can be retained in the opening to serve as a cover for an actuator placed within or beneath the opening.

In some cases, the shape of the housing and cover, or the material used for the housing, can provide an orientation relative to the housing for which the aesthetic appeal of the device is maximized. For example, it may be desirable for a cover to be oriented such that its shape matches a shape of the housing (e.g., a matching curved cross-section). As another example, it may be desirable for a grain of the cover to match a grain of the housing. Different approaches can be used to maintain the position and orientation of the cut away portion of the housing and the housing with respect to each other. In some embodiments, a fixture can be provided to maintain the position and orientation of a cover once it has been cut away. The fixture can include a fixture base and a fixture cover placed on opposite sides of the housing and cover such that the housing and cover are retained by the fixture after a cutting operation is complete. In some cases, an adhesive sheet can be placed over the housing and the cover to secure them together before removing the housing and the cover from the fixture.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

An electronic device can include one or more input interfaces by which a user can control the device. Some interfaces can include an actuator with which a user can interact to provide an instruction to the device. The actuator can include, for example, a switch that must be depressed to close an electrical circuit. Because an actuator may have limited aesthetic appeal, a cover can be placed over the actuator to provide an external surface of the device. The cover can be provided within an opening of a device housing.

To improve the aesthetic appeal of an interface, a cover can be constructed from a portion of the housing. For example, a closed loop can be cut in the housing to define a removable portion of the housing that can serve as a cover. If the housing is constructed from a material that includes a grain or other feature providing an orientation for the housing, it may be desirable for the cover to maintain an orientation corresponding to the orientation of material in the housing.

Figure 1:
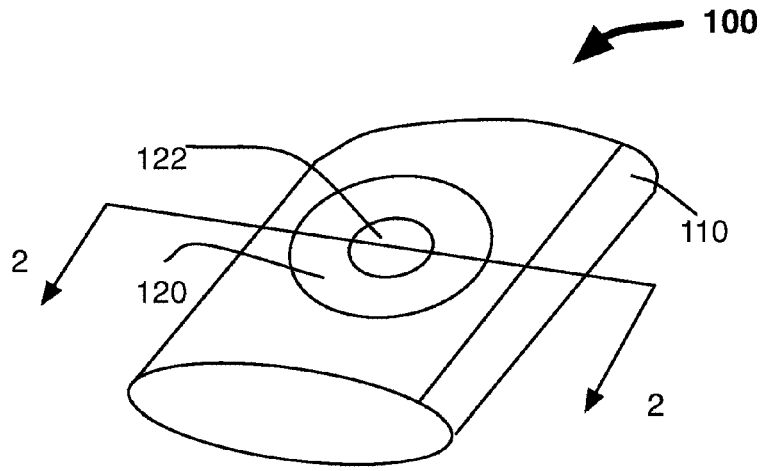
FIG. 1 is a schematic view of an illustrative electronic device in accordance with some embodiments of the invention.

FIG. 1 is a schematic view of an illustrative electronic device having a button assembly in accordance with some embodiments of the invention. Electronic device 100 can be constructed from an external housing 110 in which at least one input interface is provided. For example, housing 110 can include an opening in which wheel 120 and cover 122 are placed. Electronic device 100 can include one or more mechanical, resistive, or capacitive actuators positioned adjacent to wheel 120 and cover 122. For example, a capacitive sensor can be placed adjacent to wheel 120, and a mechanical switch can be placed adjacent to cover 122 to provide a scroll-wheel input interface (e.g., as in an iPod®, sold by Apple Inc. of Cupertino, Calif.).

Figure 2:
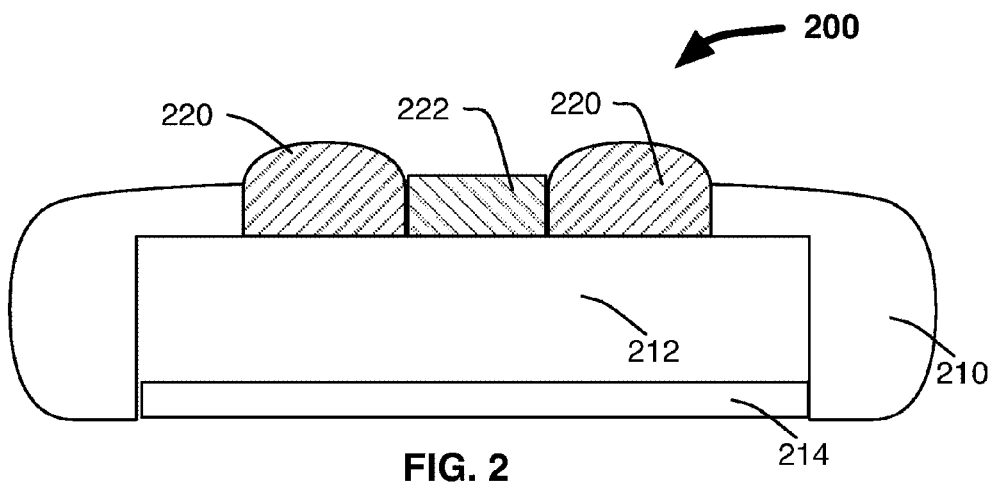
FIG. 2 is a sectional view of the electronic device of FIG. 1 taken at line 2-2 in accordance with some embodiments of the invention.

FIG. 2 is a sectional view of the electronic device of FIG. 1 taken at line 2-2 in accordance with some embodiments of the invention. Electronic device 200 can include housing 210 defining volume 212 in which electronic device components can be placed. Lid 214 can be coupled to housing 210 to close volume 212 such that components placed within the electronic device 200 may be secured and retained. An input interface of the device can make use openings provided in one or both of housing 210 and lid 214. For example, a hole can be cut in housing 210 in which cover 222 can be secured. In some cases, the hole may be sized to receive both wheel 220 and cover 222, which may be placed in the center of wheel 220.

Cover 222 can be constructed from any suitable material. For example, cover 222 can be constructed from a material that is different than the material used for housing 210 or lid 214. As another example, cover 222 can be constructed from the same material as housing 210 or lid 214, but from a different stock of material. In such cases, cover 222 can be constructed to substantially match the dimensions of the hole to avoid any gaps between cover 222 and housing 210 or lid 214. In addition, the particular orientation of cover 222 within housing 210 may not be important, as the grain of the material used for cover 222, or other features providing an orientation for cover 222, may not correspond to a grain or feature of the material used for housing 210 or lid 214 (e.g., because cover 222 and housing 210 are constructed from different stocks).

In some embodiments, however, cover 222 can be constructed from a portion of housing 210 or of lid 214. For example, a portion of housing 210 can be cut away to form cover 222. In such cases, it may be important to minimize the amount of material removed from housing 210 to create cover 222 so that a gap between housing 210 and cover 222 is also minimized. A smaller gap can be more pleasing aesthetically, and prevent debris or other artifacts from entering volume 212 and damaging electronic device components. Cover 222 can have any suitable shape including, for example, a circular, oval, rectangular, polygonal, or curved shape. In some cases, the shape of the cut, or the shape of the resulting cover 222 can be symmetrical, such that the cover can be placed within the opening created by the cut in at least two different orientations.

Different approaches can be used to cut cover 222 away from housing 210. In some embodiments, a machining process can be used. The machining process can make use of a mechanical tool such as, for example, a grinding or cutting tool to remove material from housing 210. The size of the cut can be determined from the size of the tool used in the machining process.

Figures 3A, 3B:
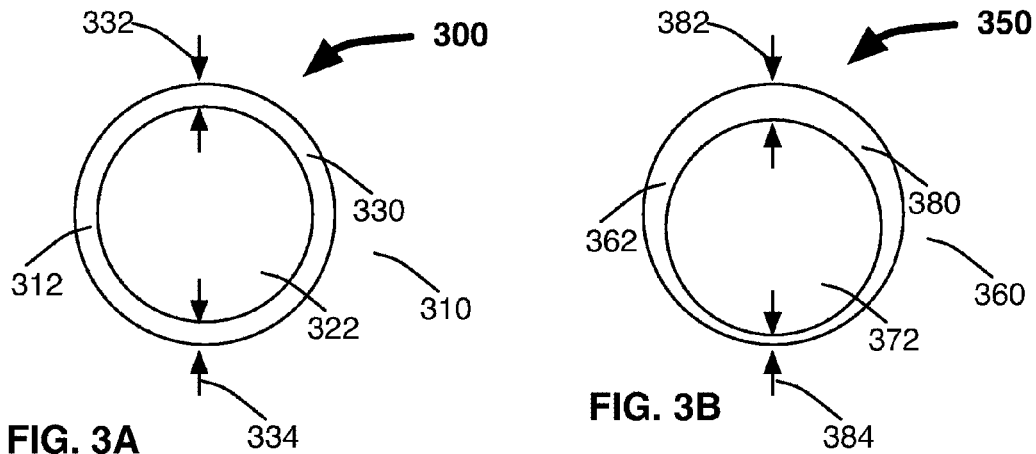
FIGS. 3A and 3B are top views of a portion of a cover in accordance with some embodiments of the invention.

FIGS. 3A and 3B are top views of a portion of a cover in accordance with some embodiments of the invention. Device 300 can include housing 310 having opening 312 from which cover 322 is cut. Due to the manufacturing process, dimensions of cover 322 (e.g., a diameter of cover 322) may be smaller than opening 312, which may result in gap 330 between a periphery of cover 322 and a periphery of opening 312. The size of gap 330 can be related from the tool used to cut cover 322 from housing 310. Gap 330 can have any suitable size including, for example, a size in the range of 0.05 mm to 0.9 mm (e.g., approximately 0.5 mm). To provide an aesthetically pleasing interface, it may be desirable for gap 330 to be distributed in a uniform manner around cover 320. For example, it may be desirable for gaps 332 and 334, located on opposite sides of cover 320, to be substantially the same, or to be so small that a user cannot tell that the gaps are different.

Some manufacturing processes, however, can create a gap that is large enough for a user to visually distinguish variations in the size of gap 330 around cover 322. When cover 322 is no longer centered within opening 312, the aesthetic appeal of electronic device 300 may be reduced. For example, as shown in FIG. 3B, device 350 can include housing 360 having opening 362 in which cover 372 is placed. Gap 380 can extend between a periphery of cover 372 and a periphery of opening 362. If cover 372 is not centered relative to opening 362, gap 380 can vary between large gap 382 and small gap 384 on opposite sides of cover 372. If the difference in gap size is perceptible, it may be aesthetically displeasing to a user.

Figure 4:
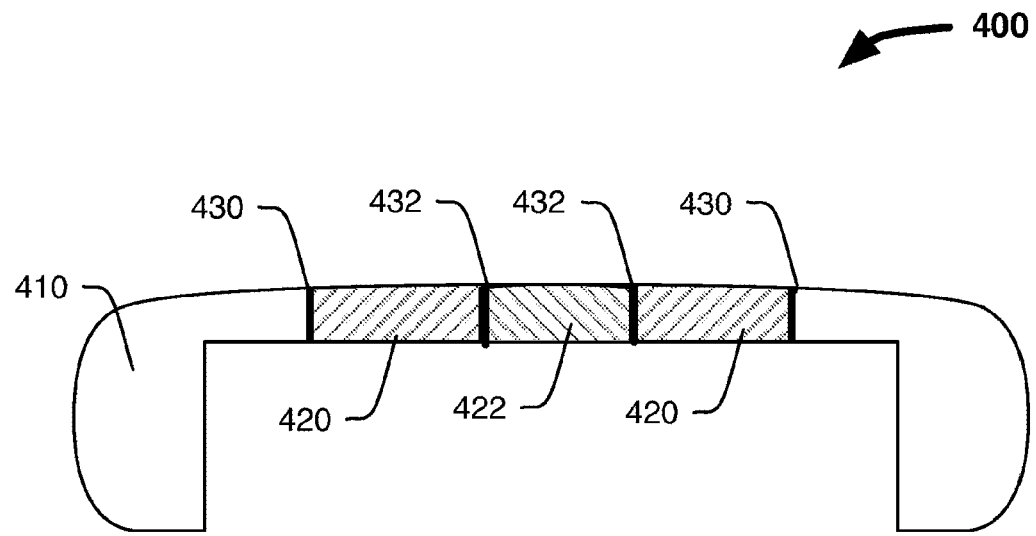
FIG. 4 is a sectional view of a portion of an illustrative electronic device from which a cover is cut using a laser in accordance with some embodiments of the invention.

To minimize the dimensions of the gap, a laser cutting process can be used to cut a cover from a housing. Because a laser can be narrowly focused, the cut provided by a laser may be so small that variations in gap size may be substantially insignificant to a user's perception. FIG. 4 is a sectional view of a portion of an illustrative electronic device from which a cover is cut using a laser in accordance with some embodiments of the invention. Device 400 can include housing 410, which may include some or all of the features of the housings described above. One or both of wheel 420 and cover 422 can be separated from housing 400 by cuts 430 and 432. To limit the size of gaps between housing 410, wheel 420, and cover 430, a laser can be used to make the cuts. The laser can be tuned based on a desired size of a gap between components, the material to be cut, or combinations of these. For example, a laser can be selected to create cuts that are less than 0.1 mm thick.

Because the cuts required for separating the wheel and cover from the housing define closed loops, the wheel and cover may fall away from the housing when they are cut. Although a fixture can be used to partially retain the wheel or cover during the cutting process, the wheel or cover may still move relative to the housing once the cutting process is complete (e.g., the wheel or cover may fall away when the fixture is removed). When the wheel or cover is re-positioned within the housing to form part of an input interface, the orientation of the wheel or cover may differ relative to the initial orientation prior to the cutting process. If the material has a grain or other feature providing a specific orientation (e.g., a non-planar shape such as a curved center cover), the re-positioned wheel or cover may not match the housing. The resulting perceived mis-alignment of the wheel and/or cover may detract from the cosmetic appeal of the electronic device.

Figure 5:
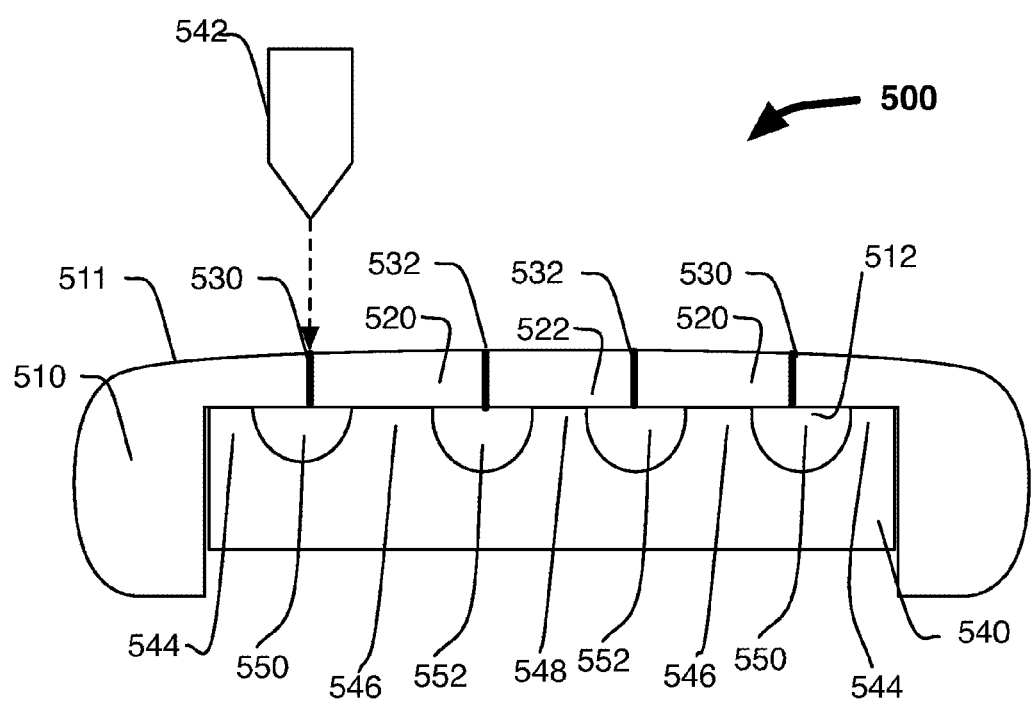
FIG. 5 is a sectional view of a portion of an illustrative device housing placed within a fixture for retaining cut away portions of housing material in accordance with some embodiments of the invention.

To ensure that the aesthetic appeal of the electronic device is maintained, a fixture and process can be used to retain cut away portions of the housing that serve as covers for input interfaces. FIG. 5 is a sectional view of an illustrative device housing placed within a fixture for retaining cut away portions of housing material in accordance with some embodiments of the invention. Assembly 500 can include housing 510 placed in fixture 540. Using assembly 500, a high-powered laser used to remove material can create cuts 530 and 532 in housing 510 to define wheel 520 and cover 522.

Laser 542 can be positioned adjacent to surface 511 or to surface 512 of housing 510 (e.g., an interior or exterior surface of housing 510). In some cases, the particular surface that is first cut by the laser can be selected based on attributes of the laser, or on an aesthetic appearance of a surface that has been cut using laser 542. For example, if a laser cut is cleaner on an entrance surface (e.g., surface 511) than on an exit surface (e.g., surface 512), housing 510 can be oriented such that an external surface of the housing (e.g., a surface that will be visible to a user) is placed adjacent to laser 542.

Laser 542 can remove material from housing 510 by melting, burning, vaporizing, or blowing away material from the housing. The removed material may be directed away from surface 511 at which the laser first contacts the housing, and towards surface 512 opposite surface 511. The removed material may be expelled from housing 510 along the direction of laser 542 (e.g., out of surface 512). To retain housing 510 during the laser cutting process, while allowing the laser to remove the material required for each of the cuts, fixture 540 can include arms extending towards housing 510 and coming into contact with different portions of housing 510. For example, fixture 540 can include extensions or arms 544 for retaining housing 510, arms 546 for retaining wheel 520, and arm 548 for retaining cover 522. Fixture 540 can include any suitable number of arms for each portion of housing 510 including, for example, a single continuous structure extending around a gap. In some cases, several arms can be used to retain a particular cut-away portion of housing 510 (e.g., use two arms for cover 522, not shown).

Fixture 540 can include pockets corresponding to each of the cuts for receiving material removed by each cut to be expelled from housing 510. For example, fixture 540 can include pocket 550 corresponding to cut 530 and pocket 552 corresponding to cut 532. In some cases, several pockets can be connected, for example as a part of a loop.

The pockets can have any suitable size within fixture 540. In some cases, the depth, width, or volume of a pocket can be determined from an amount of material to be cut, a type of material used for the housing, a type of laser, a laser power, a laser size (e.g., corresponding to a cut size), a material used for the fixture, or combinations of those. In some cases, the pockets of a particular fixture can be sized to accommodate cuts corresponding to covers or other external elements having different dimensions. The particular material used for fixture 540 can be selected such that laser 542 may not cut into fixture 540.

Figure 6:
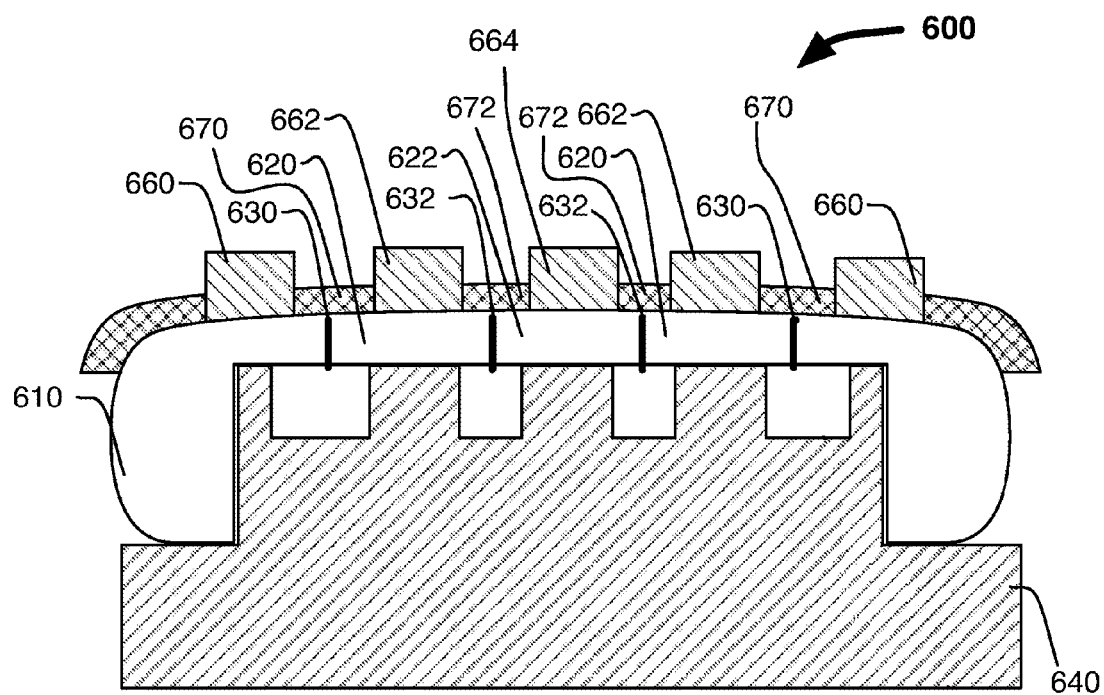
FIG. 6 is a sectional view of a portion of an illustrative electronic device placed in a fixture in accordance with some embodiments of the invention.

As discussed above, it may be desirable to maintain a position or orientation of a cover, wheel, or other external component that is cut away from the housing for aesthetic reasons. To retain a cut-away portion of the housing, the fixture can include a fixture cover positioned such that the housing is secured between the fixture and the fixture cover. FIG. 6 is a sectional view of a portion of an illustrative electronic device placed in a fixture in accordance with some embodiments of the invention. Assembly 600 can include housing 610 from which wheel 620 and cover 622 are cut. Housing 610 can be retained by fixture 640, which can include some or all of the features of fixture 540 (FIG. 5) described above.

Fixture 640 can include several magnets used to secure housing 610, wheel 620, and cover 622 to fixture 640, thus maintaining the orientation and position of wheel 620 and cover 622 relative to housing 610 once cuts 630 and 632 have been made. The array of magnets can be part of a fixture cover placed opposite a fixture base. In particular, assembly 600 can include magnet 660 placed over housing 610, magnet 662 placed over wheel 620, and magnet 664 placed over cover 622. The magnets can be positioned and sized such that regions of housing 610 in which cuts 630 and 632 are to be made remain exposed for access by the cutting tool (e.g., a laser). Fixture 640 can be constructed at least partially from a material that responds to magnetic forces such that portions of housing 610, wheel 620, and cover 630 can be secured between a magnet and fixture 640.

Once the cuts have been made, one or more adhesive sheets can be placed over the portions of the housing that are not covered by magnets 660, 662, and 664. For example, adhesive sheet 670 can be placed over cut 630 between housing 610 and wheel 620 and adhesive sheet 672 can be placed over cut 632 between wheel 620 and cover 622. The adhesive sheets can serve to maintain the position and orientation of wheel 620 and cover 622 relative to housing 610, which can allow the magnets to be removed to release housing 610 and its cut away portions.

Figure 7:
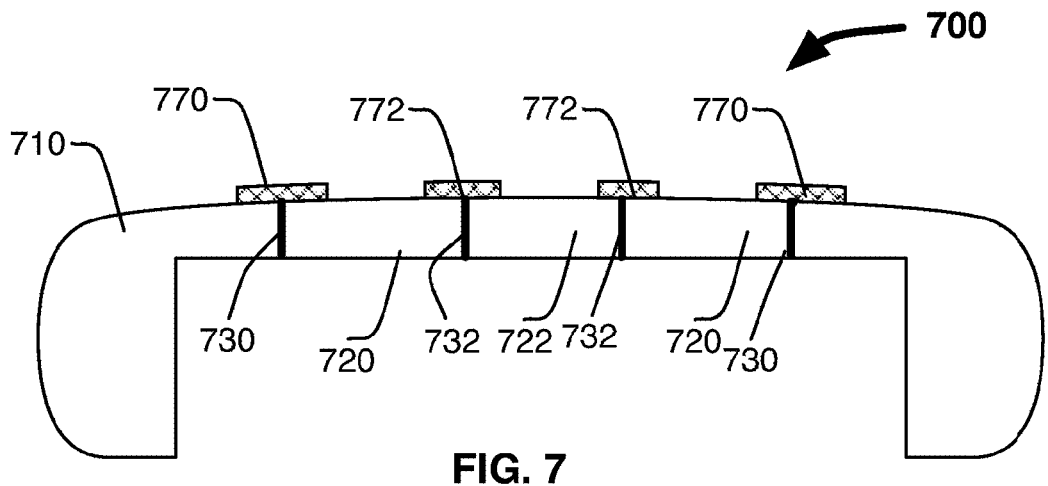
FIG. 7 is a sectional view of a housing having adhesive sheets in accordance with some embodiments of the invention.
Figure 8:
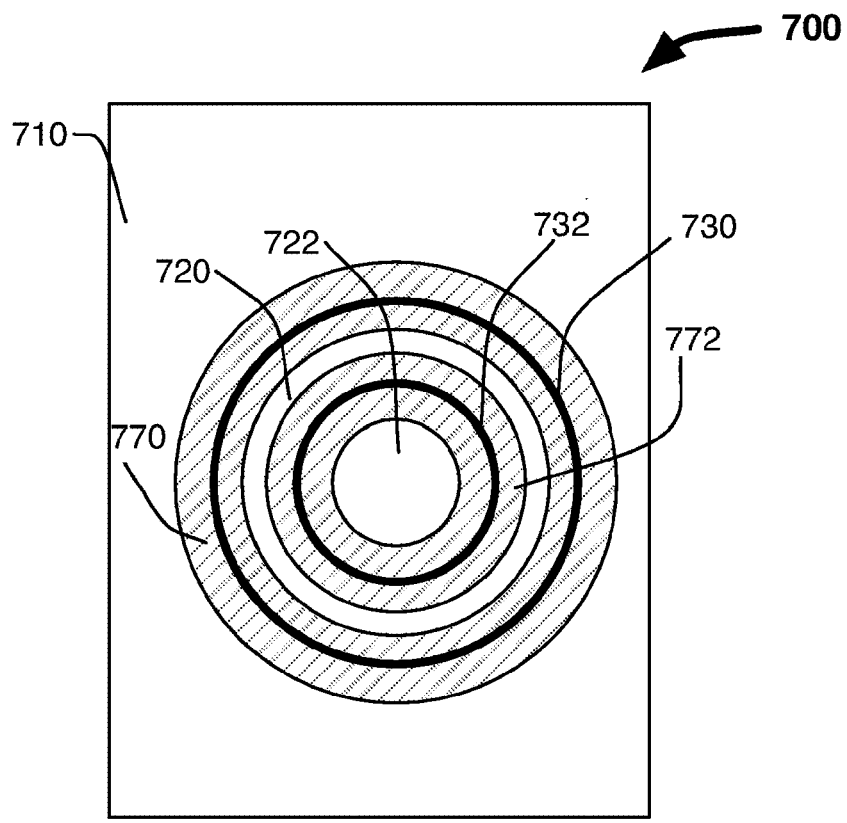
FIG. 8 is a top view of the housing of FIG. 7 having adhesive sheets in accordance with some embodiments of the invention.

FIG. 7 is a sectional view of a housing having adhesive sheets in accordance with some embodiments of the invention. FIG. 8 is a top view of the housing of FIG. 7 having adhesive sheets in accordance with some embodiments of the invention. Housing 710, wheel 720 and cover 722 can include some or all of the features described above. Adhesive sheets 770 and 772 can be placed over cuts 730 and 732 respectively, provided in housing 710. In some cases, adhesive sheets 770 and 772 can form a single adhesive sheet in the shape of a ring. In some cases, if the disposition of the magnets of the fixture allows it, adhesive sheets 770 and 772 can all be partially connected to form a unified adhesive sheet.

Figure 9:
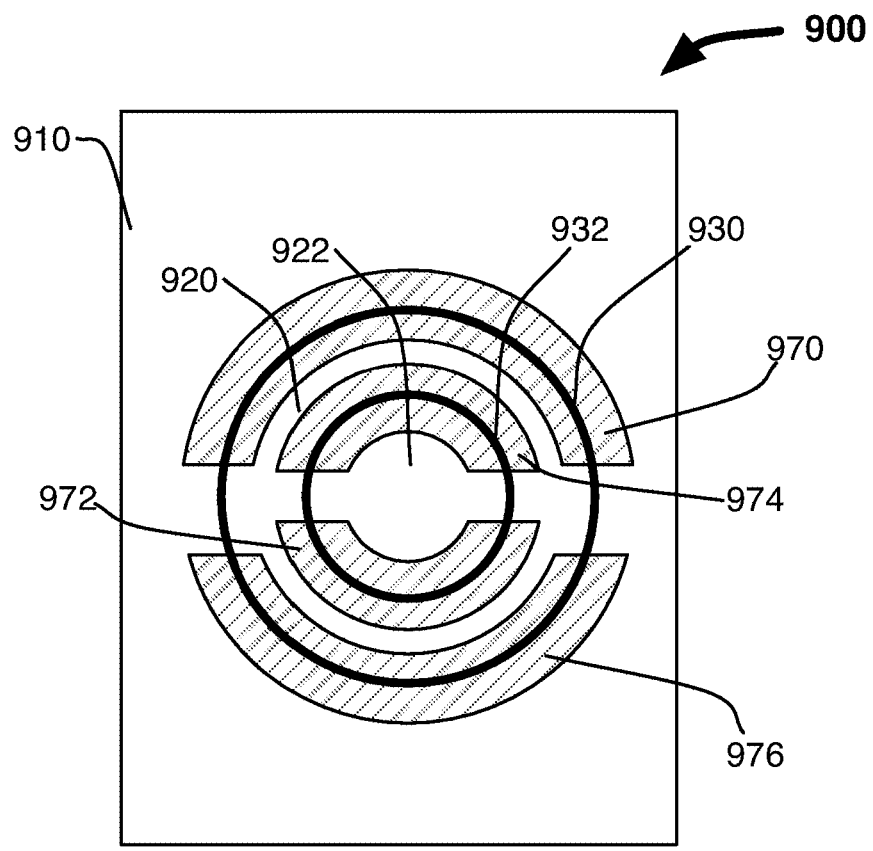
FIG. 9 is a top view of a housing having several adhesive sheets in accordance with some embodiments of the invention.

In some cases, several adhesive sheets can combine to form part or all of a ring. For example, two or more distinct adhesive sheets can be placed over each cut. Housing 910, wheel 920 and cover 922, shown in FIG. 9, can include some or all of the features described above. Adhesive sheets 970 and 976 can be placed over cut 930 between housing 910 and wheel 920. Adhesive sheets 972 and 974 can be placed over cut 932 between wheel 920 and cover 922. Each of the adhesive sheets can have the same or different size, and cover a same or different amount of a cut. The adhesive sheets may or may not overlap, based on how securely wheel 920 and cover 922 need to be coupled to housing 910.

The adhesive sheets used for the housing can be provided using any suitable approach. In some cases, a sheet of material having an integrated adhesive (e.g., tape) can be used. In other cases, an adhesive can first be placed over the housing, wheel, and cover, and a sheet of material can subsequently be placed over the adhesive for form an adhesive sheet. The adhesive sheet can extend over any suitable portion of the housing. For example, the adhesive sheet can be limited to regions adjacent to the cut (e.g., to reduce the size of the adhesive sheet). As another example, the adhesive sheet can extend over large portions of the housing to ensure that the cut away portions of the housing material are securely retained.

In some cases, other approaches can be used to ensure that the cut away wheel and cover remain in position while and after the cuts are made. For example, one or more suction-cups, vacuum-assisted elements, or other components can be used to retain a cut away cover. As another example, the fixture can include opposing arms that apply a force to the housing, the wheel and the cover such that the wheel and the cover are constrained on upper and lower surfaces by the fixture (e.g., sandwiched by the fixture).

Figure 10:
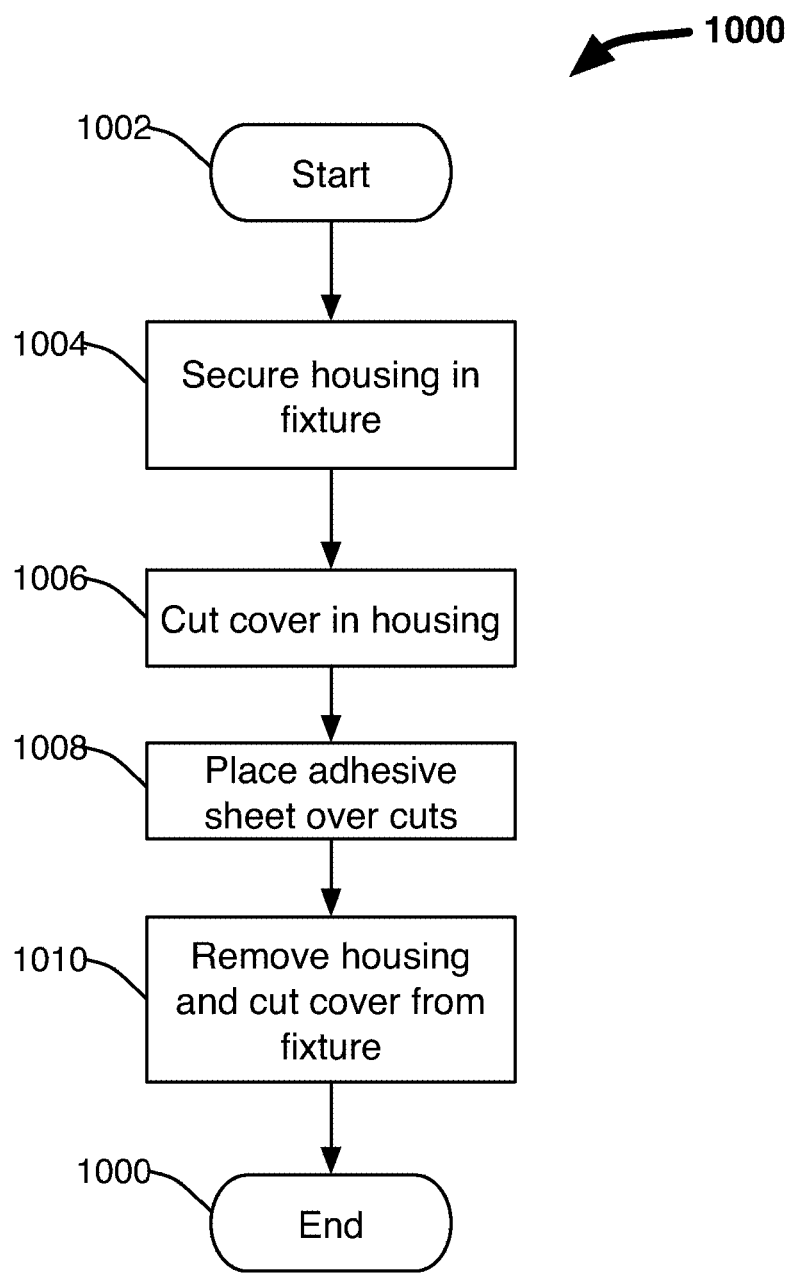
FIG. 10 is a flowchart of an illustrative process for maintaining a position of a cover cut away from a housing in accordance with some embodiments of the invention.

The following flowchart illustrates a process used to create a housing having cut out external elements or covers. FIG. 10 is a flowchart of an illustrative process for maintaining a position of a cover cut away from a housing in accordance with some embodiments of the invention. Process 1000 can begin at step 1002. At step 1004, a housing can be secured in a fixture. In some cases, the fixture can be configured to maintain a position and orientation of portions of the housing that are cut away with respect to the housing. For example, the fixture can include one or more magnets operative to be placed over the housing to interact with portions of the fixture on an opposite side of the housing. At step 1006, a cover can be cut in the housing. For example, a laser can be used to cut a cover used as part of an input interface (e.g., a part of a button assembly). At step 1008, an adhesive sheet can be placed over the cut portions of the housing such that the adhesive sheet is secured to opposite sides of the cut. For example, the adhesive sheet can be secured to both the housing and the cover. At step 1010, the housing and the cut cover can be removed from the fixture. For example, the housing and the cover, held together using the adhesive sheet, can be removed from the fixture and provided to a subsequent process. In particular, the housing and the cover can be provided to a process for connecting the cover to an actuator of an input interface. Process 1010 can then end at step 1012.

The previously described embodiments are presented for purposes of illustration and not of limitation. It is understood that one or more features of an embodiment can be combined with one or more features of another embodiment to provide systems and/or methods without deviating from the spirit and scope of the invention.

What is claimed is:

1. A method for cutting a cover from a housing of an electronic device, comprising:
    retaining the housing in a fixture;
    cutting a closed loop in the housing, wherein a portion of the housing that is enclosed within the closed loop forms the cover;
    placing an adhesive sheet over the closed loop, wherein the adhesive sheet is coupled at least partially to the cover and to the housing to keep them in a specific orientation with respect to each other; and
    removing the housing and cover from the fixture such that the housing and cover remain coupled together via the adhesive sheet.

2. The method of claim 1, further comprising:
    placing an extension of the fixture in contact with a portion of the cover; and
    placing a magnet opposite the extension, wherein the housing is secured between the extension and the magnet.

3. The method of claim 2, further comprising:
    cutting the housing around the magnet to define the closed loop.

4. The method of claim 2, further comprising:
    removing the magnet to release the cover, wherein the magnet is removed after the adhesive sheet has been placed over the cut closed loop.

5. The method of claim 2, further comprising:
    placing a second extension of the fixture in contact with a portion of the housing that does not correspond to the cover; and
    placing another magnet opposite the other extension.

6. The method of claim 1, wherein:
    cutting further comprises cutting using a laser.

7. The method of claim 1, wherein placing an adhesive sheet further comprises:
    maintaining a position and orientation of the cover relative to the housing after the closed loop is made; and
    securing the adhesive sheet to a portion of the cover and to a portion of the housing in the maintained position and orientation.

8. The method of claim 1, further comprising:
    positioning a magnet of a fixture cover over a fixture base to retain the housing and the cover.

* * * * *